(12) United States Patent
Baumeister

(10) Patent No.: US 11,835,637 B2
(45) Date of Patent: Dec. 5, 2023

(54) METHOD FOR RADIO DIRECTION FINDING, DIRECTION FINDING SYSTEM AS WELL AS PLATFORM

(71) Applicant: Rohde & Schwarz GmbH & Co. KG, Munich (DE)

(72) Inventor: Andreas Baumeister, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 304 days.

(21) Appl. No.: 16/680,253

(22) Filed: Nov. 11, 2019

(65) Prior Publication Data

US 2020/0191898 A1    Jun. 18, 2020

(30) Foreign Application Priority Data

Dec. 12, 2018  (EP) .................................. 18211860

(51) Int. Cl.
*G01S 3/10* (2006.01)
*G01S 3/04* (2006.01)

(52) U.S. Cl.
CPC .............. *G01S 3/10* (2013.01); *G01S 3/046* (2013.01)

(58) Field of Classification Search
CPC ... G01S 3/10; G01S 3/046; G01S 3/46; G01S 3/023; G01C 21/20
See application file for complete search history.

(56) References Cited

U.S. PATENT DOCUMENTS

| 2006/0190174 | A1* | 8/2006 | Li | G01C 17/38 |
| | | | | 701/530 |
| 2010/0324862 | A1* | 12/2010 | Sato | G01C 17/38 |
| | | | | 702/150 |
| 2011/0045848 | A1* | 2/2011 | Okeya | G01C 21/20 |
| | | | | 455/456.3 |
| 2012/0155382 | A1* | 6/2012 | Grzechnik | G01C 17/38 |
| | | | | 370/328 |
| 2013/0027251 | A1* | 1/2013 | Lu | G01S 5/04 |
| | | | | 342/451 |
| 2015/0226554 | A1* | 8/2015 | Eick | G01C 17/38 |
| | | | | 702/94 |

(Continued)

FOREIGN PATENT DOCUMENTS

AU       723107 B2    8/1998
DE    19704853 C1    6/1998
(Continued)

*Primary Examiner* — Timothy A Brainard
*Assistant Examiner* — Hailey R Le
(74) *Attorney, Agent, or Firm* — CHRISTENSEN O'CONNOR JOHNSON KINDNESS PLLC

(57) ABSTRACT

A method for radio direction finding using a direction finding system having an antenna, a magnetic field sensor and a control unit, the method comprising: receiving a radio frequency signal of at least one emitter via the antenna by the control unit obtaining a received signal; receiving a magnetic measurement value of the magnetic field at the direction finding system via the magnetic field sensor; correcting the magnetic measurement value obtaining a corrected magnetic measurement value; correcting the received signal obtaining a corrected signal; and determining the precise bearing of the emitter based on the corrected received signal and the corrected magnetic measurement value. Further, a direction finding system and a platform are disclosed.

20 Claims, 2 Drawing Sheets

(56) References Cited

U.S. PATENT DOCUMENTS

2016/0187134 A1\* 6/2016 Kimishima ............ G01C 21/16
33/356
2018/0025651 A1\* 1/2018 Anderson ............. B64C 39/024
701/2

FOREIGN PATENT DOCUMENTS

| GB | 1344547 A | | 1/1974 | |
|----|-----------|---|--------|---|
| GB | 2007059 A | | 5/1979 | |
| JP | S6280573 A | | 4/1987 | |
| WO | WO-2008046363 A1 | \* | 4/2008 | ............... G01S 3/10 |

\* cited by examiner

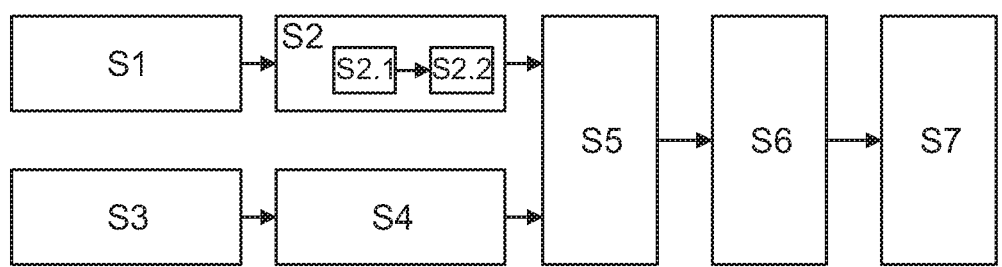
Fig. 3
| f | A | B | C |
|---|---|---|---|
| 1GHz | 210° | -1,3 | 208,7° |
| 1,2GHz | | | |
| . | | | |
| . | | | |
| . | | | |
Fig. 4
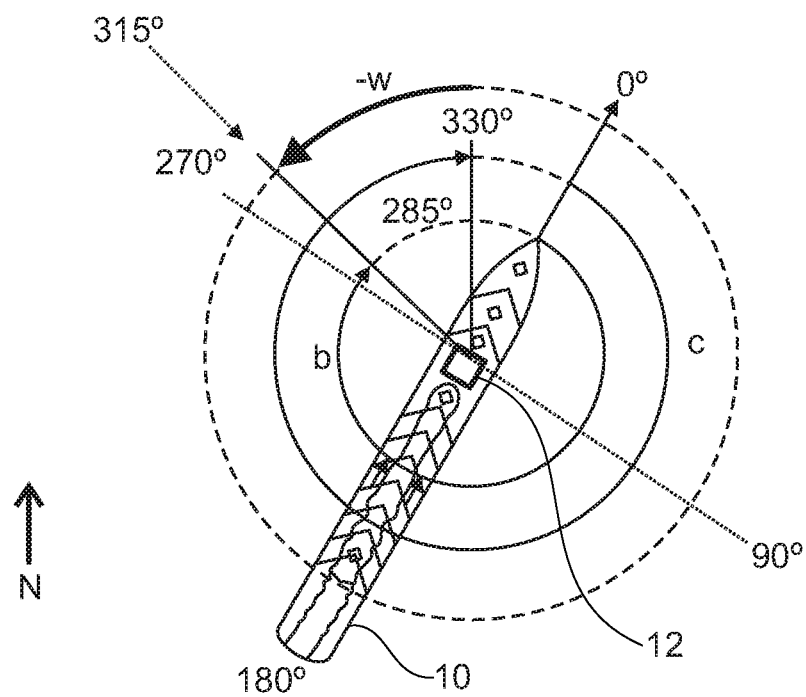
Fig. 5

METHOD FOR RADIO DIRECTION FINDING, DIRECTION FINDING SYSTEM AS WELL AS PLATFORM

FIELD OF THE DISCLOSURE

Embodiments of the disclosure relate to a method for radio direction finding using a direction finding system for a platform, a direction finding system for a platform as well as a platform comprising a direction finding system.

BACKGROUND

In direction finding systems and in methods for radio direction finding, a bearing to an emitter is determined using an antenna. Further, a magnetic sensor is used to determine the absolute bearing. However, the known methods have been proven to be imprecise, especially when direction finding systems are used on different platforms.

SUMMARY

Thus, there is a need to provide a method for radio direction finding, a direction finding system and a platform, which provide very precise bearings.

For this purpose, a method is provided for radio direction finding using a direction finding system for a platform, in particular a vehicle. In an embodiment, the direction finding system has at least one antenna, at least one magnetic field sensor and a control unit electrically connected to the at least one magnetic field sensor and the at least one antenna. The method, in an embodiment, comprises the following steps:
  receiving at least one radio frequency signal of at least one emitter via the antenna by the control unit obtaining a received signal;
  receiving a magnetic measurement value of the magnetic field at the direction finding system via the magnetic field sensor by the control unit;
  correcting the magnetic measurement value obtaining a corrected magnetic measurement value;
  correcting the received signal obtaining a corrected signal; and
  determining the precise bearing of the emitter based on the corrected received signal and the corrected magnetic measurement value.

By correcting the magnetic measurement value and the received signal, the accuracy of the bearing can be improved drastically.

The step of correcting and/or the step of determining is preferably performed by, for example, the control unit.

The vehicle may be an aquatic vehicle, like a ship, a land-based vehicle, like a car or truck, or an airborne vehicle, like a plane.

In an embodiment of the disclosure, the magnetic measurement value is corrected by the control unit using a predetermined magnetic correction table having magnetic correction values, for example, wherein the magnetic correction values are based on at least magnetic deviations of the magnetic field surrounding the direction finding system caused by the platform itself and/or by alignment errors of the magnetic field sensor mounted the platform. This way, the magnetic measurement value is corrected individually.

The magnetic correction values are suitable to be used by the control unit to correct at least measurement errors or bearing errors.

For example, the received signal is corrected by the control unit using a predetermined azimuth correction table having azimuth correction values, for example, wherein the azimuth correction values are based on at least the influence of the platform on the measurement of the antenna allowing individual correction of the received signal.

The azimuth correction values are suitable to be used by the control unit to correct at least measurement errors or bearing errors.

In an embodiment, the magnetic correction table having magnetic correction values and/or the azimuth correction table having azimuth correction values is provided by a suitably arranged look-up table(s), data base(s) provided in a data store, etc. The look-up table(s), the data base(s) provided in a data store, etc., may be associated with or part of the control unit.

The azimuth correction values may depend on the frequency of the at least one radio frequency signal and/or the bearing determined using the received signal, further improving accuracy.

For determining the correction values accurately, the magnetic correction table and/or the azimuth correction table has been determined prior to operation of the platform, for example the magnetic correction table and/or the azimuth correction table has been determined for each platform individually.

The magnetic correction table and/or azimuth correction table may be determined individually for each platform, even if platforms are of the same make and model.

In another embodiment, the method having at least one of the following further steps, in any combination, allowing further action and analysis of the bearing:
  visualizing the precise bearing on a display of the direction finding system, in particular using a GUI and/or a map;
  storing the precise bearing;
  further processing the precise bearing;
  printing the precise bearing; and
  generating an acoustic output using a speaker of the direction finding system representing the precise bearing.

The visualization may be a map, in which the precise bearing and/or the estimated location of the emitter is marked.

Further, for an above object, a direction finding system for a platform, for example a vehicle, comprises at least one antenna, at least one magnetic field sensor and a control unit electrically connected to the at least one magnetic field sensor and the at least one antenna, wherein the control unit is configured to perform a method as described above.

In an embodiment, the magnetic field sensor is a compass and/or the antenna is a directional antenna allowing precise measurements.

In an embodiment, the direction finding system comprises a display for visualizing the precise bearing, a speaker for generating an acoustic output representing the precise bearing and/or a printer for printing the precise bearing so that information about the bearing is easily available.

The control unit may comprise a magnetic correction table and/or an azimuth correction table for simple and reliable correction of the measured values.

For an above object, further a platform, for example, a vehicle is provided comprising a direction finding system as discussed above.

For example, the predetermined magnetic correction table and/or the azimuth correction table are specific to the platform, for example, the magnetic correction table and/or the azimuth correction table are specific to the specific platform individually allowing very individual and precise correction.

The word "specific" is used in the sense that the correction table has been determined prior to operation of the platform of the direction finding system, for example the correction table has been determined for each platform individually.

Of course, the features and advantages discussed in the context of the disclosure also apply to the direction finding system and the platform and vice versa.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

FIG. 3 shows a flow chart of a method according to the disclosure;

FIG. 4 shows an azimuth correction table for use in the method according to FIG. 3; and FIG. 5 shows a platform with a direction finding system in a different scenario.

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
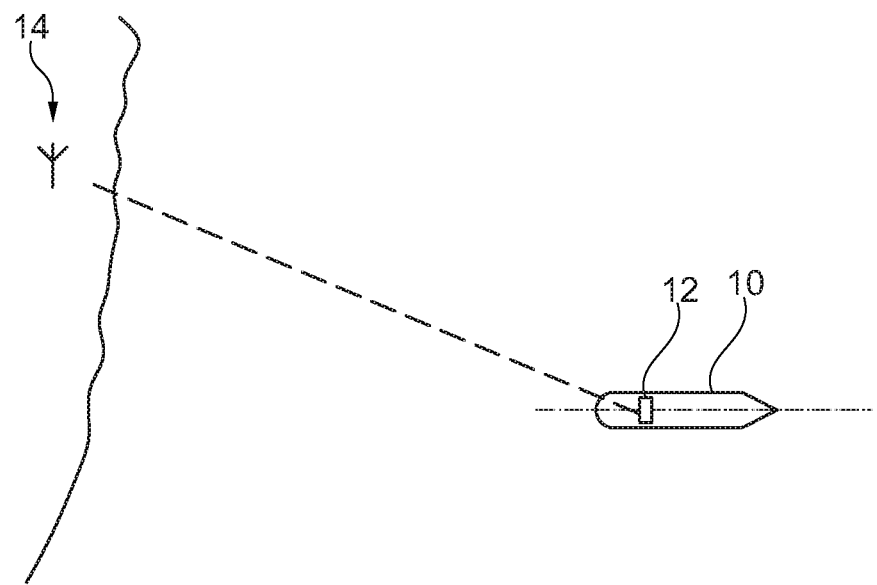
FIG. 1 shows a platform according to the disclosure with a direction finding system according to the disclosure while using the method according to the disclosure.

FIG. 1 shows a platform 10 with a direction finding system 12. In the shown embodiment, the platform 10 is an aquatic vehicle, like a ship. The platform 10 may also be a land-based vehicle, like a car or a truck, or an airborne vehicle like a plane.

In the shown scenario, the platform 10 is navigating in the sea and an emitter 14, for example a radio beacon station, is located at the shore. The emitter 14 emits at least one radio frequency signal—for example with a frequency of 1 GHz—that can be used for location finding of vehicles.

Figure 2:
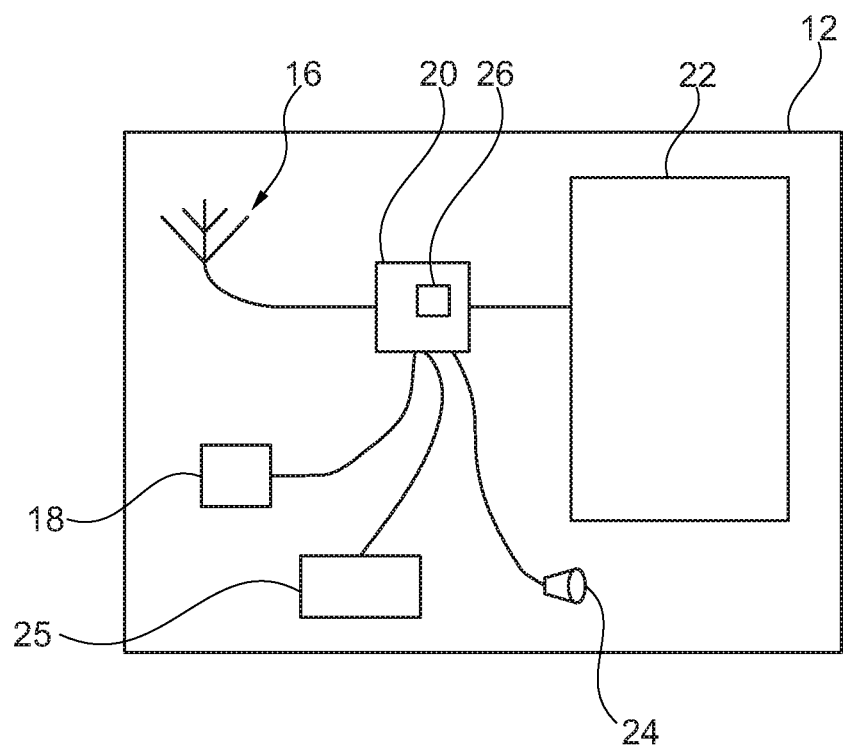
FIG. 2 shows the direction finding system according to FIG. 1 in more detail.

FIG. 2 shows the direction finding system 12 in detail. As shown in the embodiment of FIG. 2, the direction finding system 12 comprises an antenna 16, for example a directional antenna, a magnetic field sensor 18, for example a compass, a control unit 20, a display 22, a speaker 24 and a printer 25. The antenna 16, the magnetic field sensor 18, the display 22, the speaker 24 and the printer 25 are electrically and operatively connected to the control unit 20. Thus, the control unit 20 controls the antenna 16, the magnetic field sensor 18, the display 22, the speaker 24 and/or the printer 25.

The control unit 20 comprises a memory 26, in which correction tables may be stored, for example a magnetic correction table and/or an azimuth correction table 28 (FIG. 4).

The control unit 20 is configured to determine the bearing of the emitter 14 and/or the location of the platform 10 based on bearings form multiple emitters 14. The control unit 20 may perform the method for radio direction finding shown as a flow chart in the example of FIG. 3.

In a first step S1 the radio frequency signal of the emitter 14 is received by the antenna 16 and transmitted to the control unit 20 as a received signal. In the next step S2 the control unit 20 corrects the received signal and thus obtains a corrected received signal. In an embodiment, the control unit uses, for example, the azimuth correction table 28 stored in the memory 26.

The azimuth correction table 28 is, for example, a multidimensional array of azimuth correction values based on one or more parameters. A simplified illustration of the azimuth correction table 28 is shown in FIG. 4. In the azimuth correction table 28 for given frequencies f and determined bearings (column A) an azimuth correction value (column B) is given. Also, in column C the corrected value for the bearing is stored.

The azimuth correction table 28 with its azimuth correction values is determined prior to operation of the platform 10, for example by determining the bearing of emitters from a known direction. The determined bearing based on the received signal does not correspond to the actual bearing of the emitter because the platform 10 disturbs the measurement of the antenna 16.

The azimuth correction table 28 may be determined prior to operation for one type of platform 10, in this embodiment for a specific make and model of the ship or platform in general. However, to achieve even better results, the azimuth correction table 28 may be determined for each specific platform 10 individually. For example, even though different platforms 10 may be of the same series, i.e. are of the same make and model, each of the platforms 10 has its specific unique azimuth correction table 28.

Of course, the azimuth correction table could also be an azimuth correction function for calculating the azimuth correction value or the corrected signal.

The azimuth correction values are based on these influences and may then be used to eliminate these deviations from the received signal of the antenna 16.

With this kind of information, especially with the azimuth correction values, the control unit 20 in one embodiment is able to determine the corrected signal, for example as follows.

In step S2.1, the control unit 20 determines a rough bearing of the emitter 14 based on the received signal only, for example as 210°. In the next step S2.2, the control unit 20 looks up the correction value for the determined rough bearing and the frequency f of the radio frequency signal, which is 1 GHz in the shown example.

As can be seen in FIG. 4, the azimuth correction value in this case is −1.3 so that the corrected signal is a corrected bearing of 208, 7°.

This corrected bearing is, however, not the final and precise bearing to be determined. For example, in an embodiment, simultaneously or subsequently, the magnetic field at the direction finding system 12 is determined by the magnetic field sensor 18. The measurement value of the magnetic field, called magnetic measurement value in the following, is transmitted to the control unit 20 (step S3).

Subsequently, the control unit 20 corrects the magnetic measurement value to obtain a corrected magnetic measurement value. In an embodiment, the magnetic measurement value and the corrected measurement value may be bearings with respect to the magnetic North. The corrected magnetic measurement value is determined by the control unit 20 using the magnetic correction table stored in memory, such as memory 26.

Just like the azimuth correction table 28, the magnetic correction table comprises magnetic correction values that may be based on the measured value, the temperature or other parameters. The magnetic correction table may also be a two-dimensional table or multidimensional array of correction values. Of course, the magnetic correction table could also be a magnetic correction function for calculating the magnetic correction value or the corrected magnetic measurement value.

The magnetic correction table with its magnetic correction values is determined prior to operation of the platform 10, for example by determining the magnetic measurement values in a known magnetic field. The magnetic field measured by the magnetic field sensor 18 does not correspond to the actual magnetic field surrounding the platform 10 because the platform 10 itself creates deviations in the magnetic field surrounding the direction finding system 12 and the magnetic field sensor 18 may be misaligned with respect to the longitudinal axis of the platform 10.

The magnetic correction values are based on these measured deviations and may then be used to eliminate these deviations from the magnetic measurement values of the magnetic field sensor 18.

The magnetic correction table may be determined for one type of platform 10, in this embodiment for a specific make and model of the ship. However, to achieve even better results, the magnetic correction table may be determined for each specific platform 10 individually. For example, even though different platforms 10 may be of the same series, i. e. are of the same make and model, each of the platforms 10 has its specific unique magnetic correction table.

By applying the magnetic correction values to the magnetic measurement values, the control unit 20 obtains corrected magnetic measurement values for further use (step S4).

In the next step, step S5, the control unit 20 determines the precise bearing of the emitter 14 using the corrected magnetic measurement value and the corrected received signal—for example the corrected bearing. This may be done using a per se known method for determining bearings, as shown in FIG. 5.

From 360°, the corrected magnetic measurement value c, e. g., the bearing with respect to magnetic North, is subtracted and the corrected signal b, e. g., the corrected bearing of the emitter 14 is added yielding the precise bearing w (shown as −w in FIG. 5). Mathematically speaking: w=360°−c+b.

Thus, the precise bearing of the emitter 14 can be determined, and the precise bearing is also based on the received signal and the magnetic measurement value, even though they have been corrected.

In the next step S6, the precise bearing is visualized on the display 22, for example using a GUI, and/or by reproducing a map, in which the precise bearing and/or even the estimated location of the emitter 14 is marked.

In the same or other step S6, an acoustic signal representing the precise bearing may be generated by the speaker 24 controlled by the control unit 20.

In step S6 or in a further step, the precise bearing may also be printed, by the printer 25 or stored in the control unit 20 or elsewhere.

It is also possible that in a further step S7, the precise bearing is processed further.

It is of course possible that the correction of the received signal and the correction of the magnetic measurement value may be interdependent from one another. For example, the azimuth correction table 28 may have azimuth correction values based on the measured or corrected magnetic measurement values or vice versa.

The control unit 20 may include, in some embodiments, logic for implementing the technologies and methodologies described herein. This logic of the control unit 20 can be carried out in either hardware or software, or a combination of hardware and software. In some embodiments, the control unit 20 includes one or more computing devices such as a processor (e.g., a microprocessor), a central processing unit (CPU), a digital signal processor (DSP), an application-specific integrated circuit (ASIC), a field-programmable gate array (FPGA), or the like, or any combinations thereof, and can include discrete digital or analog circuit elements or electronics, or combinations thereof.

In an embodiment, the control unit 20 includes a microprocessor and a memory storing logic modules and/or instructions. In an embodiment, the control unit 20 includes one or more ASICs having a plurality of predefined logic components. In an embodiment, the control unit 20 includes one or more FPGA having a plurality of programmable logic components. In an embodiment, the control unit 20 includes hardware circuit implementations (e.g., implementations in analog circuitry, implementations in digital circuitry, and the like, and combinations thereof). In an embodiment, the control unit 20 includes combinations of circuits and computer program products having software or firmware instructions stored on one or more computer readable memories that work together to cause a device to perform one or more methodologies or technologies described herein.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A method for radio direction finding using a direction finding system for a platform having at least one antenna, at least one magnetic field sensor and a control unit electrically connected to the at least one magnetic field sensor and to the at least one antenna, the method comprising:
- receiving, by the control unit as a received signal via the antenna, at least one radio frequency signal emitted from at least one emitter;
- receiving, by the control unit, a magnetic measurement value of the magnetic field at the direction finding system via the magnetic field sensor;
- correcting, via the control unit, the magnetic measurement value in order to obtain a corrected magnetic measurement value, wherein the corrected magnetic measurement value includes a corrected bearing with respect to a magnetic pole;
- correcting, via the control unit, the received signal in order to obtain a corrected received signal, wherein the corrected received signal includes a corrected bearing of the at least one emitter; and
- determining a precise bearing of the at least one emitter based on the corrected received signal and the corrected magnetic measurement value.

2. The method according to claim 1, wherein the magnetic measurement value is corrected by the control unit using a predetermined magnetic correction table having magnetic correction values, wherein the magnetic correction values are based on at least magnetic deviations of the magnetic field surrounding the direction finding system caused by at least one of the platform itself or alignment errors of the magnetic field sensor mounted on the platform.

3. The method according to claim 2, wherein at least one of the magnetic correction table or an azimuth correction table has been determined prior to operation of the platform.

4. The method according to claim 3, wherein at least one of the magnetic correction table or the azimuth correction table is determined for the platform individually.

5. The method according to claim 1, wherein the received signal is corrected by the control unit using a predetermined azimuth correction table having azimuth correction values.

6. The method according to claim 5, wherein the azimuth correction values depend on at least one of the frequency of the at least one radio frequency signal or the bearing determined using the received signal.

7. The method according to claim 1, further comprising:
- visualizing the precise bearing on a display of the direction finding system;
- storing the precise bearing;
- further processing the precise bearing;
- printing the precise bearing; and
- generating an acoustic output using a speaker of the direction finding system representing the precise bearing.

8. The method according to claim 7, wherein the precise bearing on the display of the direction finding system is visualized using at least one of a GUI or a map.

9. The method according to claim 1, wherein the platform is a vehicle.

10. A platform having a direction finding system comprising at least one antenna, at least one magnetic field sensor and a control circuit electrically connected to the at least one magnetic field sensor and the at least one antenna, wherein the control circuit is configured to perform the method of claim 1.

11. The platform according to claim 10, wherein the control circuit comprises at least one of:
- a magnetic correction table having magnetic correction values; or
- an azimuth correction table having azimuth correction values,
wherein at least one of the predetermined magnetic correction table or the azimuth correction table are specific to the platform individually.

12. The platform according to claim 10, wherein the platform is a vehicle.

13. A direction finding system for a platform comprising:
- at least one antenna configured to receive at least one radio frequency signal emitted by at least one emitter;
- at least one magnetic field sensor configured to generate a magnetic measurement value at a location of the direction finding system; and
- a control unit electrically connected to the at least one magnetic field sensor and to the at least one antenna, wherein the control unit includes circuitry configured to:
  - receive as a received signal via the at least one antenna the at least one radio frequency signal;
  - receive the magnetic measurement value of the magnetic field at the direction finding system generated by the magnetic field sensor;
  - correct the magnetic measurement value in order to obtain a corrected magnetic measurement value, wherein the corrected magnetic measurement value comprises a corrected bearing with respect to a magnetic pole;
  - correct the received signal in order to obtain a corrected signal, wherein the corrected signal comprises a corrected bearing of the at least one emitter; and
  - determine a precise bearing of the at least one emitter based on the corrected received signal and the corrected magnetic measurement value.

14. The direction finding system according to claim 13, wherein the magnetic field sensor is a compass.

15. The direction finding system according to claim 13, wherein the antenna is a directional antenna.

16. The direction finding system according to claim 13, wherein the direction finding system comprises at least one of a display for visualizing the precise bearing, a speaker for generating an acoustic output representing the precise bearing or a printer for printing the precise bearing.

17. The direction finding system according to claim 13, wherein the control unit comprises at least one of a magnetic correction table or an azimuth correction table.

18. The direction finding system according to claim 17, wherein the control unit comprises the azimuth correction table having azimuth correction values, wherein an azimuth correction values are based on at least the influence of the platform on the measurement of the antenna.

19. The direction finding system according to claim 17, wherein the control unit comprises the magnetic correction table having magnetic correction values, wherein the magnetic correction values are based on at least magnetic deviations of the magnetic field surrounding the direction finding system caused by at least one of the platform itself alignment errors of the magnetic field sensor mounted the platform.

20. The direction finding system according to claim 13, wherein the platform is a vehicle.

* * * * *